Dec. 22, 1936.　　　W. J. McLACHLAN　　　2,065,339
SYSTEM OF ALTERNATING CURRENT DISTRIBUTION
Filed June 29, 1935
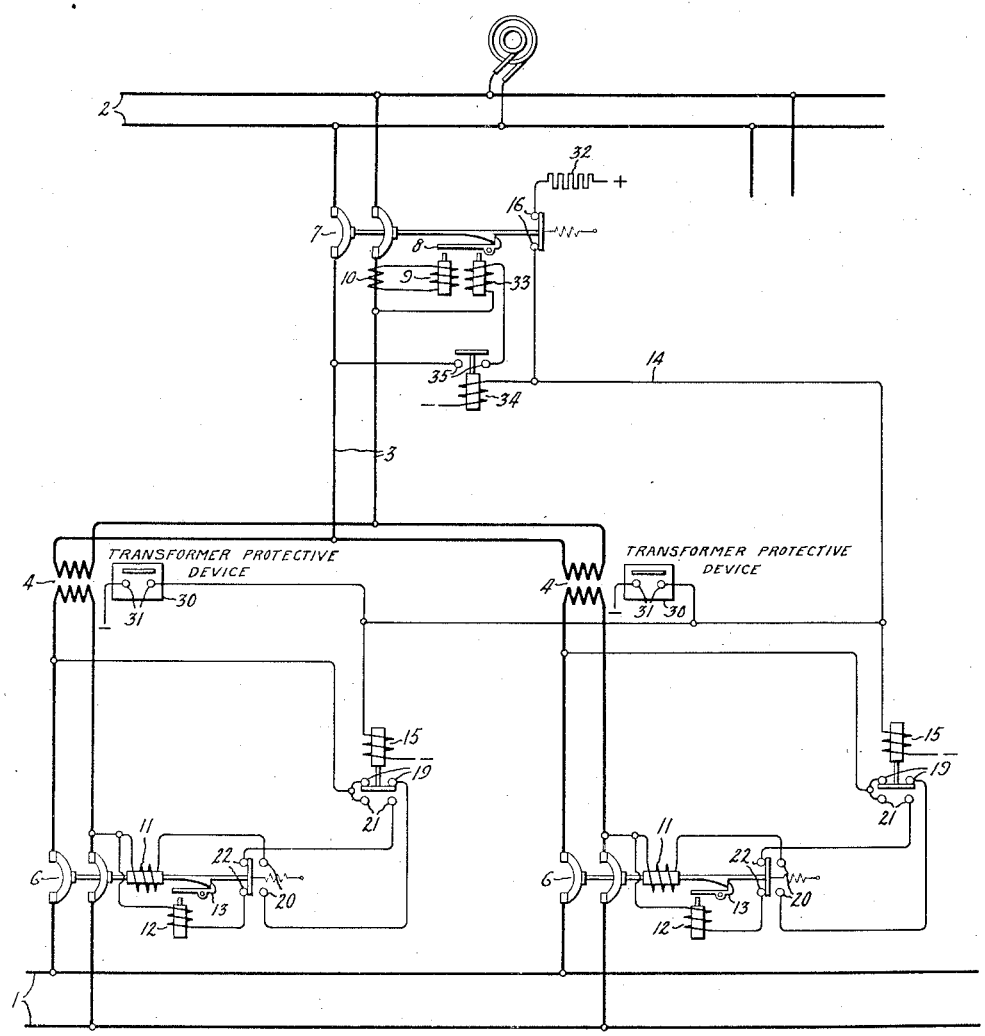
Inventor:
Willard J. McLachlan,
by Harry E. Dunham
His Attorney.

Patented Dec. 22, 1936

2,065,339

UNITED STATES PATENT OFFICE 2,065,339

SYSTEM OF ALTERNATING CURRENT DISTRIBUTION

Willard J. McLachlan, Scotia, N. Y., assignor to General Electric Company, a corporation of New York Application June 29, 1935, Serial No. 29,179

10 Claims. (Cl. 175—294)

My invention relates to systems of alternating current distribution and particularly to systems in which a relatively low voltage alternating current network is supplied with electric energy by means of a relatively high voltage feeder circuit to which the primary windings of one or more power transformers are permanently connected in parallel, the secondary windings of the transformers being connected in parallel across the network. In such systems, the feeder circuit is usually connected at some remote point, such as a substation, to a suitable source of current by a suitable overload circuit breaker or other switching means, and each transformer secondary winding is connected to the network by an individual network switch.

It has been proposed heretofore to provide a pilot wire circuit common to all of the network switches associated with a main feeder circuit and to control the energization of the pilot circuit in accordance with the position of the overload feeder breaker so that the network switches are opened whenever the feeder breaker is opened and the network switches are closed whenever the feeder breaker is closed. Due, however, to the cost of installing the necessary pilot wires, such an arrangement has not gone into extensive commercial use.

One object of my invention is to provide in such a system of alternating current distribution a pilot wire circuit which, in addition to being used to control the network switches in accordance with the position of the feeder breaker, is also used to obtain an indication of a predetermined dangerous condition in any of the transformers, thereby making it worthwhile to go to the additional expense of installing pilot wires.

In accordance with the preferred embodiment of my invention, I provide an arrangement whereby the energization of the pilot wire circuit is controlled in response to a predetermined abnormal condition in any of the transformers to effect the opening of the feeder breaker and all of the network switches.

My invention will be better understood from the following description when taken in connection with the accompanying drawing which diagrammatically illustrates a system of alternating current distribution embodying my invention, and its scope will be pointed out in the appended claims.

Referring to the drawing, I is an alternating current network which is arranged to be supplied with energy from a suitable supply circuit 2 by means of a plurality of feeders 3, only one of which is shown completed. In order to simplify the disclosure, single phase circuits are shown, but it is obvious that my invention is equally applicable to polyphase circuits.

Each feeder 3 includes a plurality of step-down transformers 4, the primary windings of which are permanently connected in parallel across the feeder 3, and the secondary windings of which are arranged to be connected to the network I by means of a suitable individual network switch 6. The feeder 3 is arranged to be connected to the supply source 2 by means of a suitable overload switch 7, which may be of any suitable type, examples of which are well known in the art. This switch 7 is usually arranged so that it may be opened and closed at the will of an operator and is also preferably arranged so that it is opened in response to an overload condition on the feeder 3. As shown, the switch 7 is of the well known latched-in type which is adapted to be closed manually and which is adapted to be opened by releasing a latch 8 either manually or automatically by means of an overload coil 9 which is connected in series relation with the feeder 3 by means of a current transformer 10.

Each of the network switches may be of any suitable type, examples of which are well known in the art. As shown in the drawing, each network switch 6 is a latched-in circuit breaker and includes a closing coil II which, when energized, closes the switch, and a trip coil 12 which, when energized, releases a latch 13 that holds a switch in its closed position.

In order to effect the opening and closing of all of the network switches 6 associated with the feeder 3 when the feeder breaker 7 is opened and closed, a pilot wire circuit 14 is provided and across this pilot wire circuit are connected in parallel suitable electroresponsive means, such as the relays 15, respectively associated with the network switches 6. Each relay 15, when it is energized, effects the completion of an energizing circuit for the closing coil II of the associated network switch 6, if it is open, and when deenergized, effects the completion of an energizing circuit for the trip coil 12 of the associated network switch 6, if it is closed. In order to effect the energization of all of the relays 15 when the circuit breaker 7 is closed, and the deenergization of all of the relays 15 when the feeder breaker 7 is open, the feeder breaker 7 is provided with the auxiliary contacts 16 which are connected in the pilot wire circuit 14 so that it connects the pilot wire circuit to a suitable source of control current when the feeder breaker 7 is closed, and disconnects the pilot wire circuit from the source of control current when the feeder breaker 7 is open.

In systems of distribution of the type shown in the drawing, failures may occur in the transformers 4 which do not cause sufficient current to flow through the feeder circuit 3 to operate the over-current trip coil 9 to effect the opening of the feeder breaker 7. These faults, such as failures between turns in the transformer windings, cause the insulating fluid in the transformer to give off considerable quantities of explosive gases. The accumulation of such gases due to these faults can and sometimes do cause severe explosions. In order to protect against these explosions, I provide each transformer, in accordance with my invention, with a suitable device 30 which responds to a predetermined abnormal condition therein, such for example as an excessive gas pressure, which indicates that a failure has occurred therein. These transformer protective devices 30 control the energization of the pilot wire circuit 14 so as to effect the deenergization of the relays 15. Since the devices 30 may be of any suitable type, examples of which are well known in the art, and the particular construction thereof forms no part of my present invention, I have shown such devices diagrammatically in order to simplify the disclosure. Each of the devices 30, when it closes its associated contacts 31 in response to a predetermined abnormal condition in the associated transformer, is arranged to complete a relatively low impedance circuit across the pilot wire circuit 14 so that all of the relays 15 are short-circuited and become deenergized to effect the opening of the associated network switches 6. A suitable impedance 32 is connected in series with the pilot wire 14 so as to limit the current that flows through the pilot wire circuit to a safe value when any of the contacts 31 are closed.

Also in order to effect the opening of the feeder breaker 7 when any device 30 closes its contacts 31, the feeder breaker 7 is provided with an additional trip coil 33, which is arranged to be connected across the feeder 3 when an associated voltage relay 34, which is connected in parallel with the relays 15, is deenergized.

The operation of the arrangement shown in the drawing is as follows: Whenever the feeder breaker 7 is closed, its auxiliary contacts 16 connect the pilot wire 14 across a suitable source of control current so that all of the relays 15 and also the voltage relay 34 are energized. Each of the relays 15, by closing its contacts 19 connects the closing coil 11 of the associated network switch 6 across the secondary winding of the associated transformer 4. This circuit also includes the auxiliary contacts 20 of the associated network switch 6. Whenever the feeder breaker 7 is opened, either automatically or by hand, the opening of its auxiliary contacts 16 opens the circuits of all of the relays 15 and also of the relay 34. Each relay 15, by closing its contacts 21, connects the trip coil 12 of the associated network switch 6 across the secondary winding of the associated transformer 4 to effect the opening of the associated switch 6. The circuit of each trip coil 12 also includes the auxiliary contacts 22 on the associated network switch 6. The relay 34, by closing its contacts 35, completes an energizing circuit for the trip coil 33 across the feeder 3 to effect the opening of the circuit breaker 7.

In case a fault occurs in any one of the transformers 4 while it is in service so that its associated protective relay 30 closes its contacts 31, a short circuit is then completed around the windings of the relays 15 and 34. These relays then become deenergized and complete, in the manner above described, a circuit for each of the trip coils 12 of the network switches 6 and also a circuit for the trip coil 33 of the feeder breaker 7. Consequently, all of the network switches 6 and also the feeder breaker 7 are opened to disconnect the feeder 3 from the supply circuit 2 and the network 1.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, a transformer, two alternating current circuits, switching means for connecting one winding of said transformer to one of said circuits, other switching means for connecting another winding of said transformer to the other of said circuits, a pilot wire circuit, means controlled by the position of said first mentioned switching means for effecting the energization of said pilot wire circuit, a relay connected to said pilot wire circuit, means responsive to the energization of said relay for effecting a predetermined operation of said other switching means and responsive to the deenergization of said relay for effecting a different predetermined operation of said other switching means, and means responsive to a predetermined abnormal condition in said transformer for effecting the deenergization of said relay.

2. In combination, a transformer, two alternating current circuits, switching means for connecting one winding of said transformer to one of said circuits, other switching means for connecting another winding of said transformer to the other of said circuits, a pilot wire circuit, means controlled by said first mentioned switching means for effecting the energization of said pilot wire circuit when said first mentioned switching means is closed, a relay connected to said pilot wire circuit, means controlled by said relay for effecting the closing of said other switching means when said relay is energized and the opening of said other switching means when said relay is deenergized, and means responsive to a predetermined abnormal condition in said transformer for effecting the deenergization of said relay.

3. In combination, a transformer, two alternating current circuits, switching means for connecting one winding of said transformer to one of said circuits, other switching means for connecting another winding of said transformer to the other of said circuits, a pilot wire circuit, means controlled by said first mentioned switching means for effecting the energization of said pilot wire circuit when said first mentioned switching means is closed, a relay connected to said pilot wire circuit, means controlled by said relay for effecting the closing of said other switching means when said relay is energized and the opening of said other switching means when said relay is deenergized, a second relay connected to said pilot wire circuit, means controlled by said second relay for effecting the opening of said first mentioned switching means when said second relay is deenergized, and means responsive to a predetermined abnormal condition in said transformer for effecting the deenergization of both of said relays.

4. In combination, an alternating current supply circuit, a network, a plurality of transformers having their primary windings connected in parallel, a switch for connecting said parallel connected primary windings to said supply circuit, an individual switch for connecting the secondary winding of each transformer to said network, a pilot wire circuit, means controlled by the position of said first mentioned switch for effecting the energization of said pilot wire circuit, a plurality of relays connected to said pilot wire circuit and respectively associated with said transformers, means responsive to the energization of a relay for effecting a predetermined operation of the associated individual switch and responsive to the deenergization of a relay for effecting a different predetermined operation of the associated individual switch, and means responsive to a predetermined abnormal condition of any of said transformers for effecting the deenergizations of all of said relays.

5. In combination, an alternating current supply circuit, a network, a plurality of transformers having their primary windings connected in parallel, a switch for connecting said parallel connected primary windings to said supply circuit, an individual switch for connecting the secondary winding of each transformer to said network, a pilot wire circuit, means controlled by the position of said first mentioned switch for effecting the energization of said pilot wire circuit when said first mentioned switch is closed, a plurality of relays connected to said pilot wire circuit and respectively associated with said transformers, means associated with each relay for effecting the closing of the associated individual switch when the relay is energized and the opening of the associated individual switch when the relay is deenergized, and means responsive to a predetermined abnormal condition of any of said transformers for effecting the deenergization of all of said relays.

6. In combination, an alternating current supply circuit, a network, a plurality of transformers having their primary windings connected in parallel, a switch for connecting said parallel connected primary windings to said supply circuit, an individual switch for connecting the secondary winding of each transformer to said network, a pilot wire circuit, means controlled by the position of said first mentioned switch for effecting the energization of said pilot wire circuit when said first mentioned switch is closed, a plurality of relays connected to said pilot wire circuit and respectively associated with said transformers, means associated with each relay for effecting the closing of the associated individual switch when the relay is energized and the opening of the associated individual switch when the relay is deenergized, another relay connected to said pilot circuit, means controlled by said last mentioned relay for effecting the opening of said first mentioned switch when said last mentioned relay is deenergized, and means responsive to a predetermined abnormal condition of any of said transformers for effecting the deenergization of all of said relays.

7. In combination, a transformer, two alternating current circuits, switching means for connecting one winding of said transformer to one of said circuits, other switching means for connecting another winding of said transformer to the other of said circuits, a pilot wire circuit, electro-responsive means associated with said pilot wire circuit and said other switching means, means controlled by the position of said first mentioned switching means for controlling the energization of said pilot wire circuit so as to cause said electroresponsive means to effect the opening of said other switching means when said first mentioned switching means is open and the closing of said other switching means when said first mentioned switching means is closed, and means responsive to a predetermined abnormal condition of said transformer for controlling the energization of said pilot wire circuit so as to cause said electroresponsive means to effect the opening of said other switching means.

8. In combination, a transformer, two alternating current circuits, switching means for connecting one winding of said transformer to one of said circuits, other switching means for connecting another winding of said transformer to the other of said circuits, a pilot wire circuit, electroresponsive means associated with said pilot wire circuit and said other switching means, means controlled by the position of said first mentioned switching means for controlling the energization of said spilot wire circuit so as to cause said electroresponsive means to effect the opening of said other switching means when said first mentioned switching means is open and the closing of said other switching means when said first mentioned switching means is closed, means responsive to a predetermined abnormal condition of said transformer for controlling the energization of said pilot wire circuit so as to cause said electroresponsive means to effect the opening of said other switching means, and means connected to said pilot wire circuit for effecting the opening of said first mentioned switching means in response to the condition of said pilot wire circuit effected by the operation of said transformer abnormal condition responsive means.

9. In combination, an alternating current supply circuit, a network, a plurality of transformers having their primary windings connected in parallel, a switch for connecting said parallel connected primary windings to said supply circuit, an individual switch for connecting the secondary winding of each transformer to said network, a pilot wire circuit, a plurality of relays connected to said pilot wire circuit and respectively associated with said transformers, means controlled by the position of said first mentioned switch for controlling the energization of said pilot wire circuit so as to cause each of said relays to effect the opening of its associated individual switch when said first mentioned switch is open and the closing of its associated individual switch when said first mentioned switch is closed, and means responsive to a predetermined abnormal condition of any transformer for controlling the energization of said pilot wire circuit so as to cause all of said relays to effect the opening of their respective individual switches.

10. In combination, an alternating current supply circuit, a network, a plurality of transformers having their primary windings connected in parallel, a switch for connecting said parallel connected primary windings to said supply circuit, an individual switch for connecting the secondary winding of each transformer to said network, a pilot wire circuit, a plurality of relays connected to said pilot wire circuit and respectively associated with said transformers, means controlled by the position of said first mentioned switch for controlling the energization of said pilot wire circuit so as to cause each of said relays to effect the opening of its associated individual switch when said first mentioned switch is open and the closing of its associated individual switch when said first mentioned switch is closed, means responsive to a predetermined abnormal condition of any transformer for controlling the energization of said pilot wire circuit so as to cause all of said relays to effect the opening of their respective individual switches, and means including an additional relay connected to said pilot wire circuit for effecting the opening of said first mentioned switching means in response to the condition of said pilot wire circuit effected by the operation of said transformer abnormal condition responsive means.

WILLARD J. McLACHLAN.